United States Patent
Sakamoto

(10) Patent No.: US 8,311,271 B2
(45) Date of Patent: Nov. 13, 2012

(54) IMAGE PROCESSING APPARATUS AND IMAGE PROCESSING METHOD

(75) Inventor: Yasuyo Sakamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 12/900,266

(22) Filed: Oct. 7, 2010

(65) Prior Publication Data

US 2011/0091117 A1   Apr. 21, 2011

(30) Foreign Application Priority Data

Oct. 20, 2009   (JP) ................. 2009-241882

(51) Int. Cl.
*G06K 9/00* (2006.01)
*H04N 5/225* (2006.01)

(52) U.S. Cl. ....................... 382/100; 348/169

(58) Field of Classification Search .......... 382/100, 382/103, 107, 162, 218, 235, 283, 307; 348/129, 348/154, 155, 169, 170, 171, 172, 208.14, 348/352; 358/3.23, 448, 462, 530; 701/28

See application file for complete search history.

(56) References Cited

U.S. PATENT DOCUMENTS 7,423,670 B2 * 9/2008 Kawai et al. ............. 348/211.99
7,522,772 B2 * 4/2009 Porter et al. .................. 382/218

FOREIGN PATENT DOCUMENTS

JP   2005127285 A   5/2005
JP   2005174352 A   6/2005

OTHER PUBLICATIONS

Yang, et al., "Detecting Faces in Images: A Survey", IEEE Transactions on Pattern Analysis and Machine Intelligence, vol. 24, No. 1, Jan. 2002.
Rowley, et al., "Neural network-based face detection", IEEE Transactions on Pattern Analysis and Machine Intelligence, vol. 20, No. 1, Jan. 1998.
Schneiderman and Kanade, "A statistical method for 3D object detection applied to faces and cars", Proceedings of the IEEE Conference on Computer Vision and Pattern Recognition (CVPR2000).
Viola and Jones, "Rapid Object Detection using Boosted Cascade of Simple Features", Proceedings of the IEEE Conference on Computer Vision and Pattern Recognition (CVPR'01).
Mikolajczyk, et al., "Face detection in a video sequence—a temporal approach", Proceedings of the IEEE Conference of Computer Vision and Pattern Recognition (CVPR'01).

* cited by examiner

*Primary Examiner* — Abolfazl Tabatabai
(74) *Attorney, Agent, or Firm* — Fitzpatrick, Cella, Harper & Scinto

(57) ABSTRACT

A apparatus holds schedule information managing, in association with each other, scheduled place information indicating a place where a user is scheduled to stay and scheduled time slot information indicating a time slot during which the user is scheduled to stay in the scheduled place. The apparatus holds, in association with the scheduled place information, a recognition dictionary used for recognizing an object being in a captured image of the scheduled place. The apparatus acquires time information indicating the current time, and an image of a place where the user stays at the current time. The apparatus specifies scheduled place information being held in association with scheduled time slot information indicating a time slot including the acquired information, and a recognition dictionary being held in association with the specified information. The apparatus recognizes an object in the acquired image using the specified dictionary to output information indicating a recognition result.

7 Claims, 11 Drawing Sheets

F I G. 6A
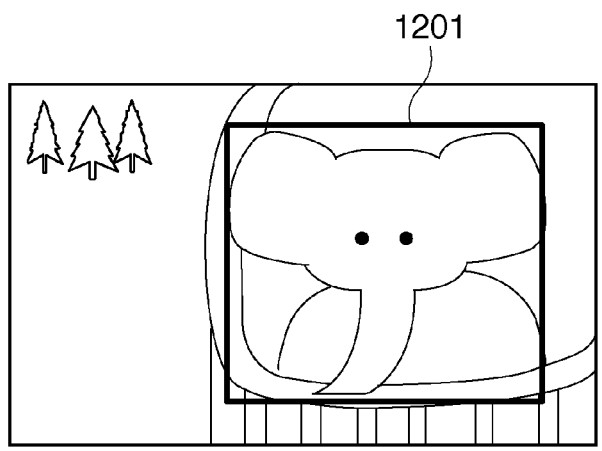
F I G. 6B
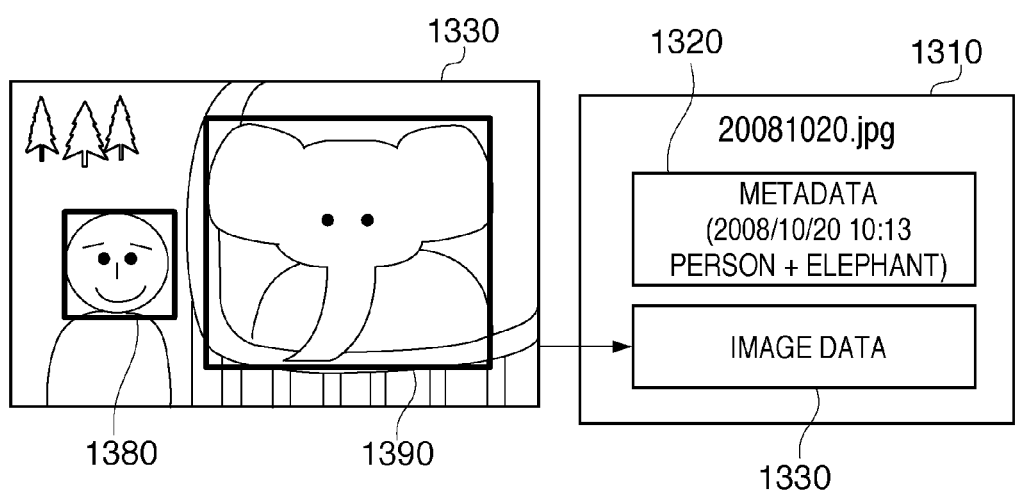

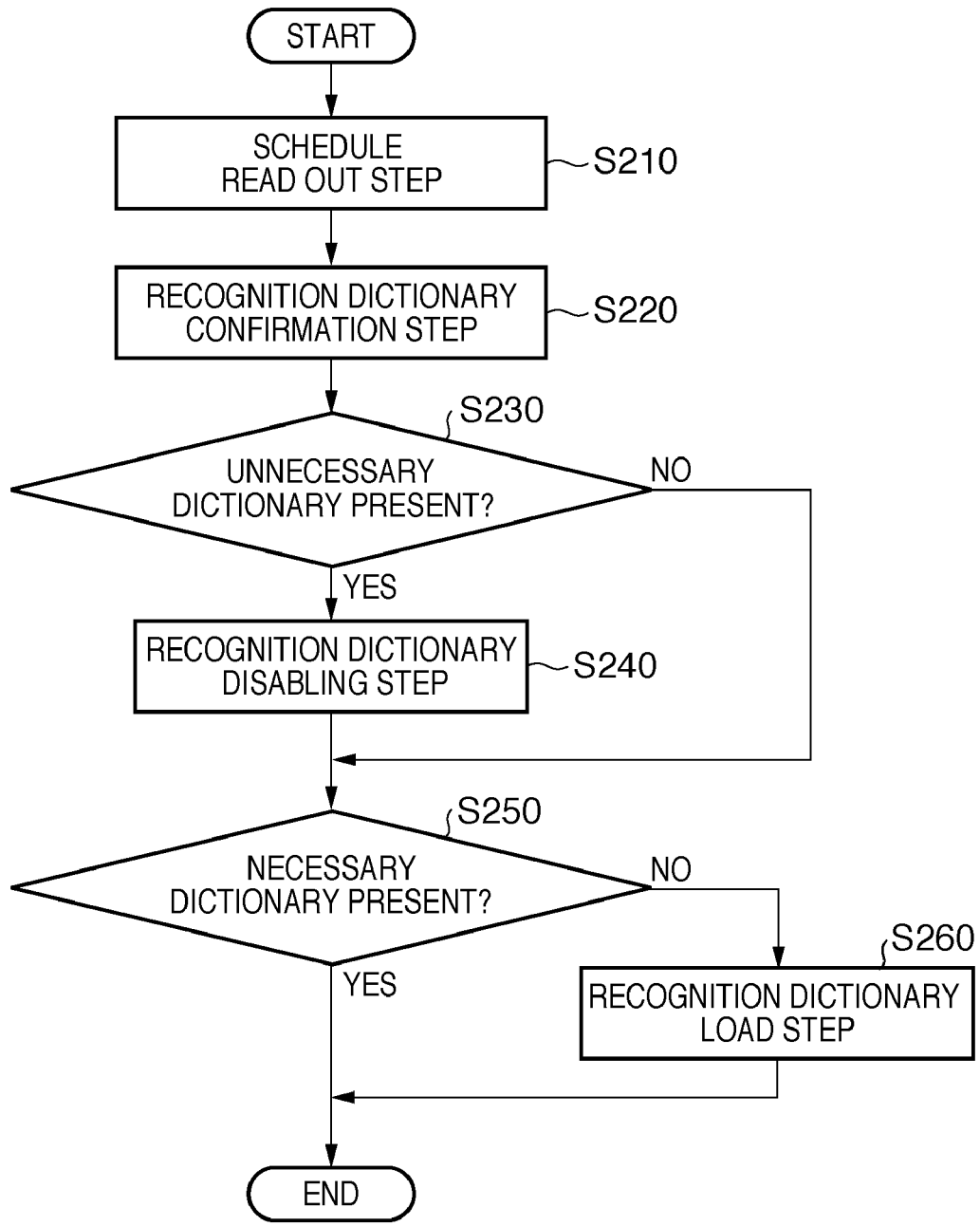

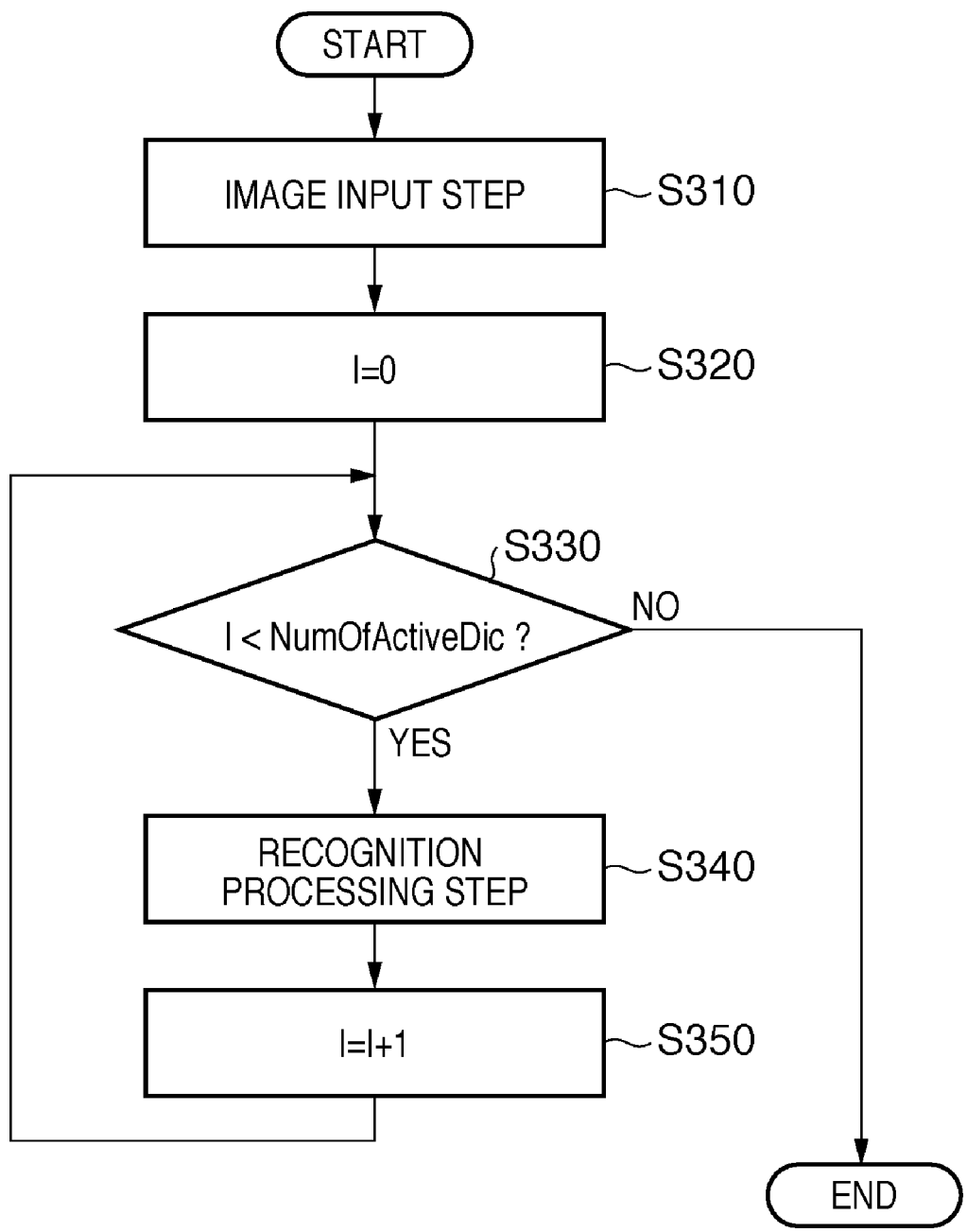

FIG. 11

| RECOGNITION DICTIONARY SET NAME | USE TIME | RECOGNITION DICTIONARY NAME |
|---|---|---|
| THEME_PARK.DAY | 10:00 \| 18:00 | PARADE.dic |
| | | CHARACTER-A.dic |
| | | COASTER-A.dic |
| THEME_PARK.NIGHT | 18:00 \| 22:00 | FIREWORKS.dic |
| | | CHARACTER-A.dic |
| | | COASTER-A.dic |

IMAGE PROCESSING APPARATUS AND IMAGE PROCESSING METHOD

BACKGROUND OF THE INVENTION

1. Field of the Invention

The present invention relates to a recognition technique.

2. Description of the Related Art

These days, with the prevalence of digital cameras or the like, and an increase in memory capacity, it has become possible to save a large amount of captured images, resulting in inconvenience for a user to arrange the captured images. Conventionally, there has been provided a technique to arrange images by attaching, to each object, information indicating who is in an image using a face authentication technique or the like. The face authentication technique will be explained below.

As a technique for discriminating human faces, there is an image processing method of automatically detecting a specific object pattern from an image. It is possible to use such a method in many fields such as teleconferences, man-machine interfaces, security, monitor systems for tracking human faces, and image compression. As a technique for detecting faces from an image, various methods have been disclosed in Yang et al, "Detecting Faces in Images: A Survey", IEEE TRANSACTIONS ON PATTERN ANALYSIS AND MACHINE INTELLIGENCE, VOL. 24, NO. 1, JANUARY 2002. The document describes a method of detecting human faces using some marked features (two eyes, mouth, nose, and the like) and a unique geometric positional relationship between these features, or using symmetric features of human faces, features of skin colors of human faces, template matching, neural networks, and the like. For example, a scheme proposed in Rowley et al, "Neural network-based face detection", IEEE TRANSACTIONS ON PATTERN ANALYSIS AND MACHINE INTELLIGENCE, VOL. 20, NO. 1, JANUARY 1998 is a method of detecting a face pattern in an image by neural networks. In Schneiderman and Kanade, "A statistical method for 3D object detection applied to faces and cars", Proceedings of the IEEE Conference on Computer Vision and Pattern Recognition (CVPR2000), discrimination processing is executed by considering the face probability of a matching pattern as an integrated model of a statistical distribution with regard to a plurality of appearances. Furthermore, Viola and Jones, "Rapid Object Detection using Boosted Cascade of Simple Features", Proceedings of the IEEE Conference on Computer Vision and Pattern Recognition (CVPR'01) is an example focusing on enhancing the processing speed. In this report, while improving the accuracy of face discrimination by effectively combining many weak discriminators using AdaBoost, each weak discriminator is configured by a Haar-like rectangular feature amount, and calculation of the rectangular feature amount is performed at high speed using an integral image. Discriminators obtained by AdaBoost learning are cascaded to constitute a cascaded face detector. The cascaded face detector removes a pattern candidate which is obviously not a face using a preceding simple (that is, a calculation amount is less) discriminator, and determines whether each of the remaining candidates is a face using a subsequent complicated (that is, a calculation amount is larger) discriminator having higher identification performance. This technique does not make complicated determination for all the candidates, thereby enabling high-speed processing. Any of the above-described techniques is applied to face detection for still images, but is not applied to face detection for moving images.

Mikolajczyk et al, "Face detection in a video sequence—a temporal approach", Proceedings of the IEEE Conference on Computer Vision and Pattern Recognition (CVPR'01) proposes a method for predicting the state of a face in a next frame based on the face detection result of a predetermined frame, and updating the face detection result by applying face discrimination processing, as an extension of a method described in Schneiderman and Kanade, "A statistical method for 3D object detection applied to faces and cars", Proceedings of the IEEE Conference on Computer Vision and Pattern Recognition (CVPR2000). This method makes it possible to integrate face discrimination results in a plurality of frames, resulting in improvement in accuracy. However, the method cannot deal with the appearance of a new face, and there has been proposed, for example, a measure against this problem to execute exhaustive search for every five frames.

Japanese Patent Laid-Open No. 2005-174352, employs a method of determining a region which has not changed with time, and excluding the region from face detection processing, in order to detect faces in a moving image in real time. This method is effective at enhancing the speed. The method, however, does not integrate face discrimination results in a plurality of frames as described in Mikolajczyk et al, "Face detection in a video sequence—a temporal approach", Proceedings of the IEEE Conference on Computer Vision and Pattern Recognition (CVPR'01), and cannot thus be expected to improve the accuracy.

A weight of a neural network and a threshold in Rowley et al, "Neural network-based face detection", IEEE TRANSACTIONS ON PATTERN ANALYSIS AND MACHINE INTELLIGENCE, VOL. 20, NO. 1, JANUARY 1998, and a parameter for defining a rectangular feature amount which a weak discriminator refers to, and an operation coefficient and a threshold for executing discrimination processing based on the rectangular feature amount in Viola and Jones, "Rapid Object Detection using Boosted Cascade of Simple Features", Proceedings of the IEEE Conference on Computer Vision and Pattern Recognition (CVPR'01) are generally called a recognition dictionary. The dictionary usually includes several ten to hundred KB data.

According to Japanese Patent Laid-Open No. 2005-127285, the recognition accuracy is improved by increasing, in a database to be used for individual recognition of a person, not only the number of personal recognition parameters but also that of the attributes of the database such as a schedule.

In many cases, however, it is impossible to sufficiently arrange images by only recognizing or authenticating a person. For example, this applies to a case in which objects are not only persons, a case in which identical objects are in many images, or a case in which no person is in an image such as a scenic image. To deal with these cases, extending the types of objects to be recognized is considered. By recognizing a variety of objects, it is possible to add more detailed bibliography information (metadata) to captured images, and more efficiently arrange them.

If the types of objects to be recognized are extended, however, parameter data (to be referred to as a recognition dictionary) for recognition processing is needed for each recognition target. The number of recognition dictionaries increases with an increase in the number of object types to be recognized, and thus a storage area for storing the recognition dictionaries becomes larger. Furthermore, more recognition processes are need with an increase in the number of recognition dictionaries. This increases the processing load of an apparatus, prolongs the processing time, or makes a configuration larger.

According to Rowley et al, "Neural network-based face detection", IEEE TRANSACTIONS ON PATTERN ANALYSIS AND MACHINE INTELLIGENCE, VOL. 20, NO. 1, JANUARY 1998, the attributes of a schedule accompany a recognition parameter, and if there are different schedules, it is necessary to have recognition parameters, the number of which is equal to that of the schedules.

SUMMARY OF THE INVENTION

The present invention has been made in consideration of the above problems, and provides a technique for executing recognition processing using recognition dictionaries corresponding to a user schedule.

According to the first aspect of the present invention, an image processing apparatus comprising: a first holding unit which holds schedule information for managing, in association with each other, scheduled place information indicating a place where a user is scheduled to stay and scheduled time slot information indicating a time slot during which the user is scheduled to stay in the scheduled place; a second holding unit which holds, in association with the scheduled place information, a recognition dictionary to be used for recognizing an object that is in an captured image when capturing the scheduled place; an acquisition unit which acquires time information indicating a current time, and also acquires an image of a place where the user stays at the current time; a first specifying unit which specifies scheduled place information that is held in the first holding unit in association with scheduled time slot information indicating a time slot including the time information acquired by the acquisition unit; a second specifying unit which specifies a recognition dictionary that is held in the second holding unit in association with the scheduled place information specified by the first specifying unit; a recognition unit which recognizes an object in the image acquired by the acquisition unit using the recognition dictionary specified by the second specifying unit; and an output unit which outputs recognition information indicating a result of the recognition processing by the recognition unit.

According to the second aspect of the present invention, an image processing method for an image processing apparatus which includes a first holding unit which holds schedule information for managing, in association with each other, scheduled place information indicating a place where a user is scheduled to stay and scheduled time slot information indicating a time slot during which the user is scheduled to stay in the scheduled place, and a second holding unit which holds, in association with the scheduled place information, a recognition dictionary to be used for recognizing an object that is in an captured image when capturing the scheduled place, the method comprising: an acquisition step of acquiring time information indicating a current time, and also acquiring an image of a place where the user stays at the current time; a first specifying step of specifying scheduled place information which is held in the first holding unit in association with scheduled time slot information indicating a time slot including the time information acquired in the acquisition step; a second specifying step of specifying a recognition dictionary which is held in the second holding unit in association with the scheduled place information specified in the first specifying step; a recognition step of recognizing an object in the image acquired in the acquisition step using the recognition dictionary specified in the second specifying step; and an output step of outputting recognition information indicating a result of the recognition processing in the recognition step.

Further features of the present invention will become apparent from the following description of exemplary embodiments with reference to the attached drawings.

BRIEF DESCRIPTION OF THE DRAWINGS

FIG. 6A is a view showing a preview display example;

FIG. 6B is a view showing the structure of information registered in an image save unit 13;

FIG. 7 is a flowchart illustrating details of step S200;

FIG. 8 is a flowchart illustrating details of step S300;

FIG. 11 is a view showing the structure of a dictionary set correspondence table 27.

DESCRIPTION OF THE EMBODIMENTS

Embodiments of the present invention will be described below with reference to the accompanying drawings. Note that each of the embodiments to be described hereinafter is an example when the present invention is practiced, and is one of practical embodiments of the arrangement described in claims.

[First Embodiment]

Figure 1:
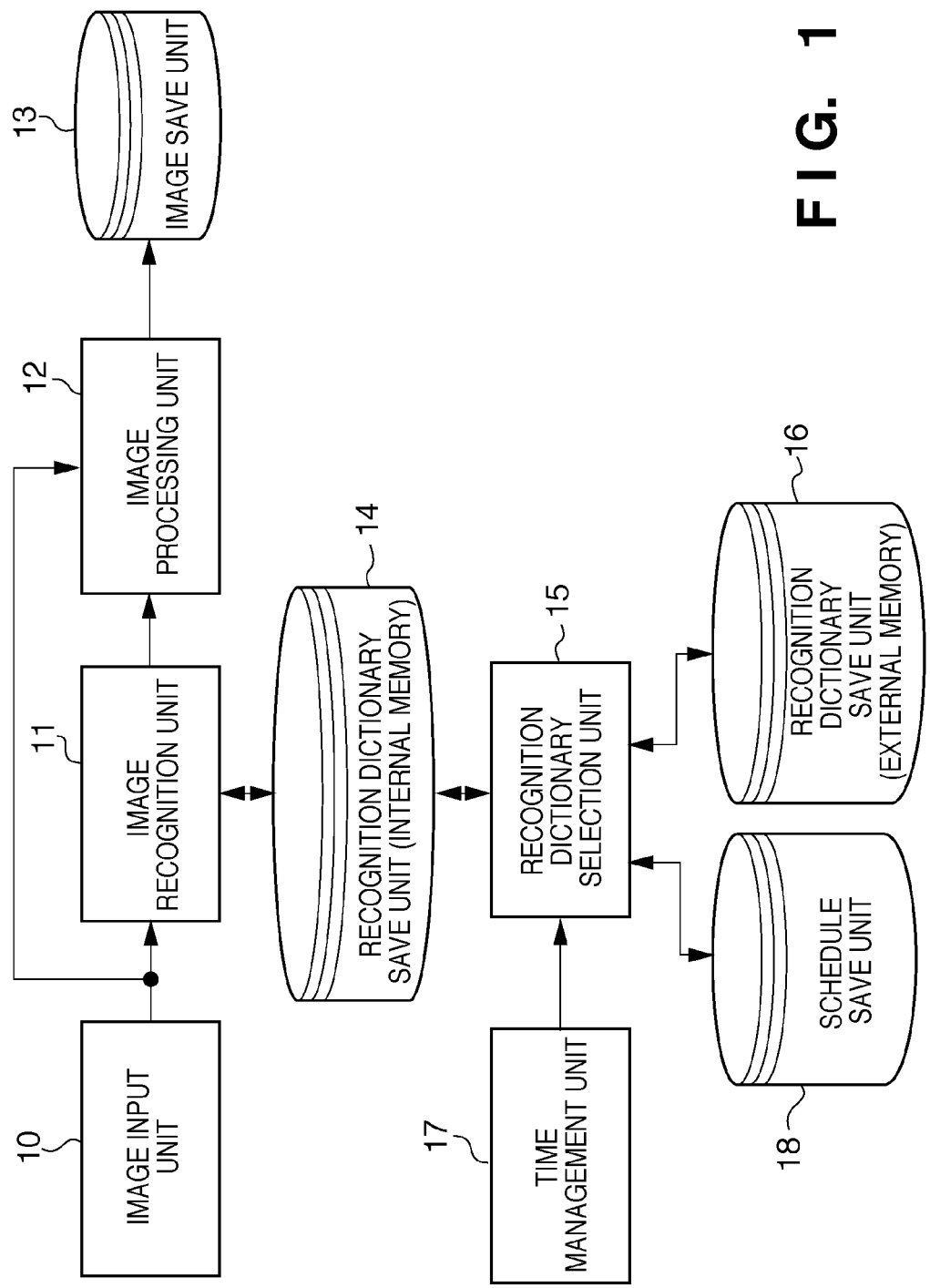
FIG. 1 is a block diagram showing an example of the functional configuration of an image processing apparatus.

A configuration used for recognition processing in an image processing apparatus according to this embodiment will be explained with reference to a block diagram in FIG. 1. In FIG. 1, components except for those involved in recognition processing have been omitted. Note that each unit shown in FIG. 1 is assumed to be implemented by hardware. Some of the units, however, may be implemented by software. In this case, the software is stored in a memory held by the image processing apparatus, and executed by a CPU (not shown).

An image input unit 10 acquires an image of each frame constituting a still image or moving image, and sends the acquired image to an image recognition unit 11 and an image processing unit 12. In either case, the image input unit 10 sends the acquired images one by one to the image recognition unit 11 and the image processing unit 12. An image may be acquired by capturing or scanning operation. An image to be acquired by the image input unit 10 may have been encoded using an encoding scheme such as well-known JPEG encoding. In this case, the image input unit 10 decodes the acquired encoded image, and then sends it to the image recognition unit 11 and the image processing unit 12.

In this embodiment, assume that the image processing apparatus serves as a digital camera. In this case, the image input unit 10 captures an image according to a capturing instruction input by the user, and sends the captured still image to the image recognition unit 11 and the image processing unit 12. The image processing apparatus may serve as an apparatus such as a PC (Personal Computer) other than a digital camera, as a matter of course.

The image recognition unit 11 executes recognition processing using recognition dictionaries stored in a recognition dictionary save unit 14 on the image input from the image input unit 10, and then detects the type and position of an object in the image. The image recognition unit 11 sends recognition information indicating the result of the recognition processing to the subsequent image processing unit 12. The recognition dictionary save unit 14 stores recognition dictionaries which the image recognition unit 11 uses for recognizing objects in the image.

The image processing unit 12 performs preview display (to be described later), and also outputs, to a subsequent image save unit 13, the recognition information indicating the result of the recognition processing executed by the image recognition unit 11, and the image input from the image input unit 10 in association with each other. Note that the output destination is not limited to this.

A time management unit 17 counts the current time. Upon reception of a request to acquire the current time, the unit 17 returns time information indicating the current time to a request source. Another apparatus may count the current time, and the time management unit 17 may acquire the current time from the apparatus, as a matter of course.

A recognition dictionary save unit 16 stores recognition dictionaries acquired from a server apparatus (to be described later). The recognition dictionary save unit 14 stores only recognition dictionaries currently used, among the recognition dictionaries stored in the recognition dictionary save unit 16.

A schedule save unit 18 stores information on a schedule set by the user. Based on the current time acquired by requesting to the time management unit 17 and the schedule information stored in the schedule save unit 18, a recognition dictionary selection unit 15 determines recognition dictionaries to be loaded into the recognition dictionary save unit 14, and then selects the determined recognition dictionaries from the recognition dictionary save unit 16. The recognition dictionary selection unit 15 downloads the selected recognition dictionaries from the recognition dictionary save unit 16 into the recognition dictionary save unit 14. If the recognition dictionary save unit 14 stores unnecessary recognition dictionaries at the current time, the recognition dictionary selection unit 15 disables those recognition dictionaries.

If the recognition dictionary save unit 14 and the recognition dictionary save unit 16 are arranged on the same storage device, recognition dictionaries in the recognition dictionary save unit 16 may be copied to the recognition dictionary save unit 14. If the states of the both units can be distinguished, the copy processing is not always necessary. In this case, by creating, on the same storage device, data indicating which recognition dictionaries are in a selected state (which recognition dictionaries can be assumed in the recognition dictionary save unit 14), the image recognition unit 11 loads the recognition dictionaries based on the data.

This embodiment will be explained on the assumption that the image save unit 13, the recognition dictionary save unit 14, the recognition dictionary save unit 16, and the schedule save unit 18 are separated into blocks because of their different functions. These units, however, need not be configured by completely different devices, and some devices may serve as those save units. For example, the recognition dictionary save unit 14 is implemented by a storage device such as a RAM which is rewritable and accessible at high speed, and the recognition dictionary save unit 16, the schedule save unit 18, and the image save unit 13 are implemented by a relatively-low-cost storage device represented by an SD card or hard disk. This is merely an example, and does not limit any memory configuration.

The operation of the image recognition unit 11 will be described with reference to a block diagram in FIG. 9. Assume that the image recognition unit 11 according to the embodiment executes recognition processing by cascading weak discriminators, as described in Viola and Jones, "Rapid Object Detection using Boosted Cascade of Simple Features", Proceedings of the IEEE Conference on Computer Vision and Pattern Recognition (CVPR'01).

The image recognition unit 11 provides a window region 2291 on an image 2200 input via the image input unit 10, and determines based on pixel values within the window region 2291 whether the window region 2291 includes an object. The image recognition unit 11 has four cascaded weak discriminators 2201 to 2204. The weak discriminators 2201 to 2204 respectively refer to different weak discriminator parameters but have the same configuration. The weak discriminators 2201 to 2204 respectively refer to weak discriminator parameters 2221 to 2224 within a recognition dictionary 2220 to perform recognition processing. The recognition dictionary 2220 includes weak discriminator parameters, the number of which is equal to that of weak discriminators. In this embodiment, each weak discriminator parameter includes parameters such as a reference region definition, an operation coefficient, and a threshold.

Each of the weak discriminators 2201 to 2204 outputs, for example, a numerical value indicating the truth/false of a determination result. As an example, each weak discriminator is configured to output, to an immediately succeeding weak discriminator, the logical sum of a truth/false value of an immediately preceding weak discriminator and that of the self weak discriminator. In this case, if the immediately preceding weak discriminator outputs a false value, the self weak discriminator outputs a false value irrespective of a determination result of itself, and thus can be configured to omit its processing. Alternatively, a weak discriminator may be configured to calculate the number of true values of the weak discriminators.

Furthermore, it is possible to configure a weak discriminator to output a value representing a likelihood instead of a truth/false, two-state value. In this case, a weak discriminator may be configured to perform operation on a likelihood output from an immediately preceding weak discriminator and that calculated by itself to obtain its output likelihood. The operation is simply addition but may include another operation such as weighted averaging or multiplication. Also, a weak discriminator may be configured to output a pair of a truth/false value and a likelihood. In this way, the image recognition unit 11 outputs a determination result 2230. The determination result 2230 indicates a value such as a truth/false value or likelihood, as described above.

Figure 9:
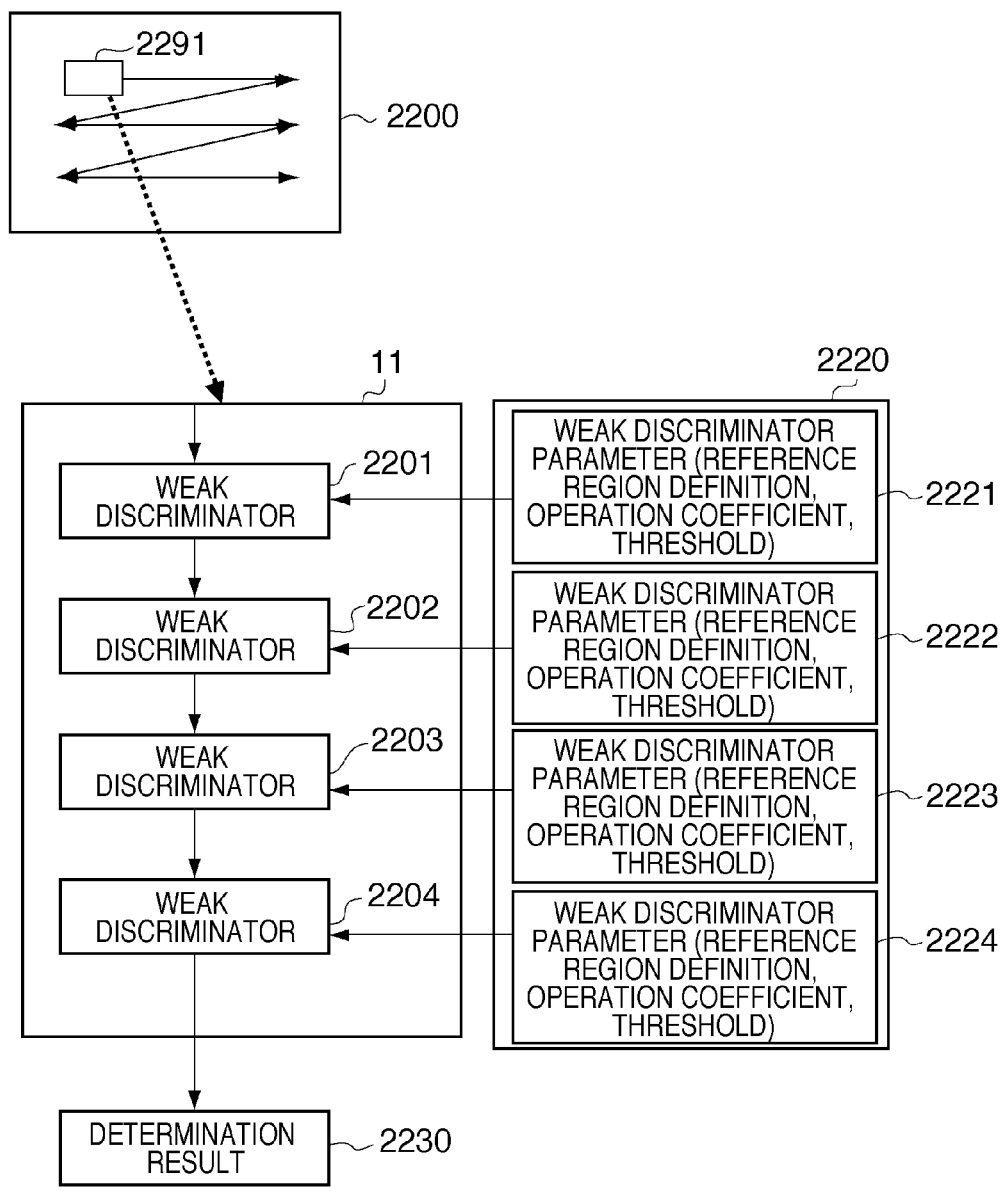
FIG. 9 is a block diagram showing an example of the functional configuration of an image recognition unit 11.

With reference to FIG. 9, the determination result 2230 is obtained by executing all the processes of the weak discriminators 2201 to 2204. If, however, any of the weak discriminators 2201 to 2204 can determine that an object is not a recognition target, the processing may be aborted at that time.

By executing the above-described recognition processing within the window region 2291 each time the window region 2291 moves within the image 2200, it is possible to obtain a recognition processing result within the window region 2291 at each position. This allows to detect an object at various positions in the image 2200. By scaling an input image to have various resolutions, and giving it as the image 2200, it is possible to detect an object having various sizes in the input image.

The configuration of the image recognition unit 11 shown in FIG. 9 is merely an example, and the present invention is not limited to this. For example, the image recognition unit 11 may be configured to repeat the recognition processing using one weak discriminator, and to perform the processing while switching the weak discriminator parameters 2221 to 2224. In this case, the recognition dictionary 2220 is configured to hold the number of weak discriminator parameters within itself, as needed. As an example, the recognition dictionary 2220 holds the four weak discriminator parameters. The recognition dictionary 2220, however, may hold an arbitrary number of weak discriminator parameters. According to this method, it is possible to detect a new object by changing the recognition dictionary 2220 to another one.

Processing for registering necessary recognition dictionaries in the recognition dictionary save unit 16 before the image processing apparatus shown in FIG. 1 executes the recognition processing will be explained with reference to a block diagram in FIG. 2. To perform the processing, an image processing apparatus 25 is connected to a server apparatus 26, and necessary information is downloaded from the server apparatus 26 into the recognition dictionary save unit 16.

Figure 2:
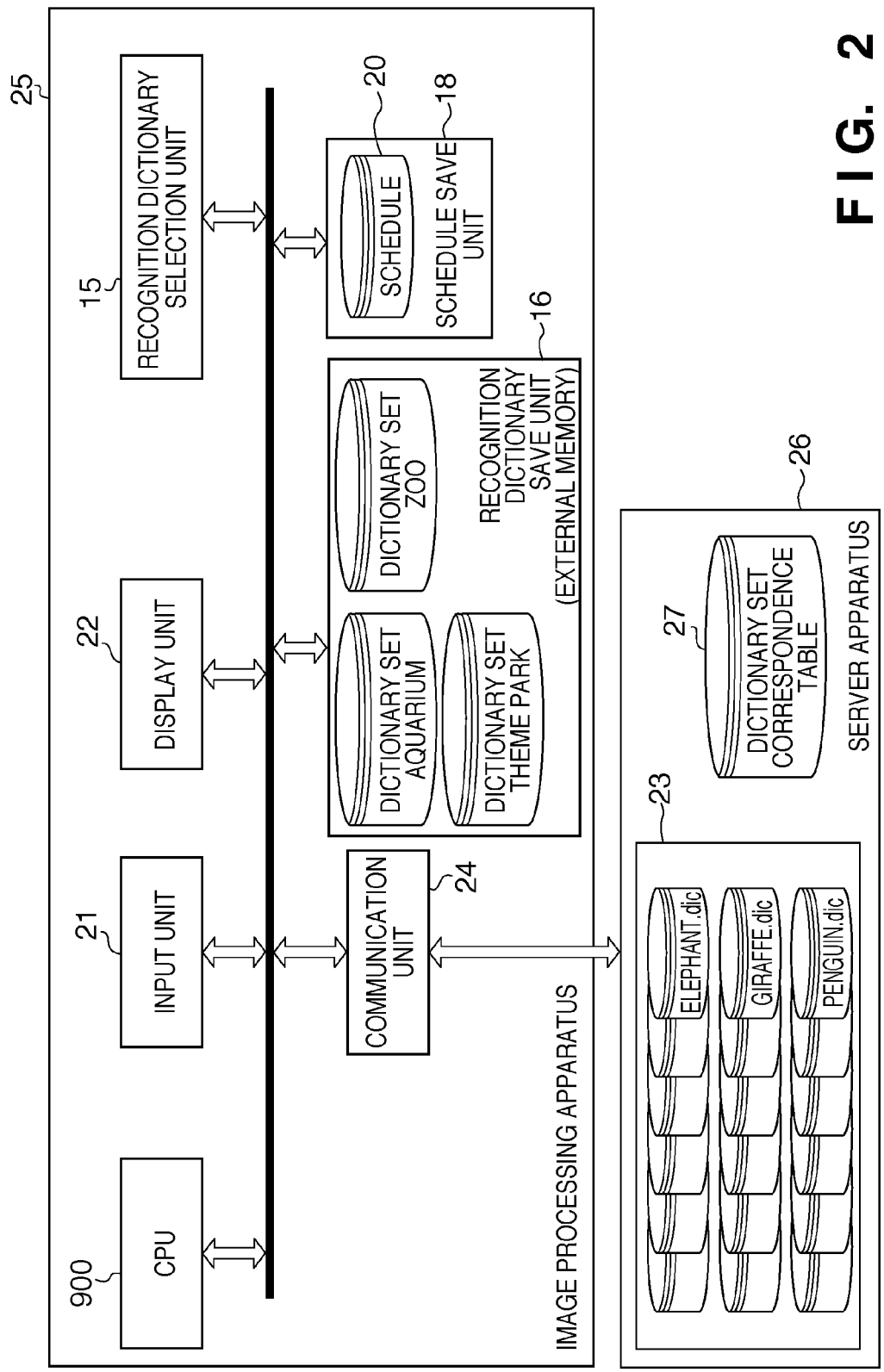
FIG. 2 is a block diagram showing an example of the functional configuration of an image processing apparatus 25 and a server apparatus 26.

Referring to FIG. 2, the image processing apparatus 25 may be the same as that shown in FIG. 1, or another one which shares the recognition dictionary save unit 16 and the schedule save unit 18 with the image processing apparatus of FIG. 1. The image processing apparatus 25 may serve as a personal computer or digital camera, like the image processing apparatus shown in FIG. 1. In this embodiment, assume that the image processing apparatus 25 is the same as that shown in FIG. 1. Note that a CPU 900 performs execution and control processing of each process which will be described later to be performed by the image processing apparatus 25.

The schedule save unit 18 saves a schedule 20 which has been input by the user through an input unit 21. Time period data and recognition dictionary set names are described in the schedule 20.

The time period data may include a pair of a start time and an end time such as "10:00 to 11:00" or a pair of a start time and a time duration such as "one hour from 10:00". In this embodiment, assume that the time period data includes a pair of a start time and an end time. The time period data may include, for example, date information.

Figures 4A, 4B, 4C:
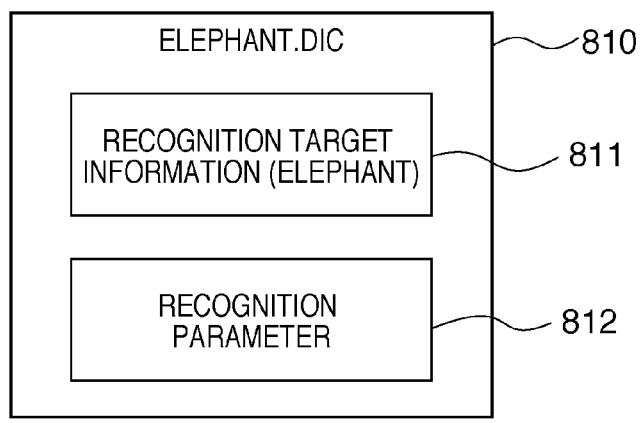
FIG. 4A is a view showing an example of a schedule 20.
FIG. 4B is a view showing the structure of a recognition dictionary.
FIG. 4C is a view showing the structure of a dictionary set correspondence table 27.

The recognition dictionary set name is a name used to extract one or a plurality of recognition dictionaries associated with a certain schedule. The recognition dictionary set name includes an arbitrary character string in this embodiment, but an identifier may be used. FIG. 4A shows an example of the schedule 20. The schedule 20 shows a schedule of the user on Oct. 20, 2008. FIG. 4A shows the schedule 20 in a table format. Times (pairs of start times and end times) are shown as time period data on the left side of the table, and keywords specifying recognition dictionary sets are shown as recognition dictionary set names on the right side. For example, a recognition dictionary set name necessary for a time slot from 9:00 to 11:00 on Oct. 20, 2008 is "zoo". Creation and edit operation of the schedule 20 is generally performed using a general-purpose GUI or the like but this does not particularly limit the information input mode.

Furthermore, "destinations" may be registered in the schedule 20 in place of the recognition dictionary set names. The schedule 20 may have any format as long as information associated with the identifiers of recognition dictionary set names and time period data are described.

The input unit 21 serves as an input interface such as a button group, and can be operated by the user to input various kinds of information to the CPU 900. A display unit 22 includes a liquid crystal screen and the like, and can display a result of processing by the CPU 900 using images and characters. For example, a user interface of a camera, a display for a PC, and the like are assumed.

The image processing apparatus 25 communicates data with the server apparatus 26 via a communication unit 24. The communication unit 24 includes a USB cable, a wireless LAN, or the like. The communication mode is not specifically limited to them, as a matter of course.

The server apparatus 26 holds a recognition dictionary group 23 and a dictionary set correspondence table 27. The server apparatus 26 may be any apparatus as long as the apparatus can hold a large amount of data, and download, among the data, data requested from an external apparatus into it.

The structure of a recognition dictionary of the recognition dictionary group 23 held by the server apparatus 26 will be explained with reference to FIG. 4B. Each recognition dictionary of the recognition dictionary group 23, therefore, has features shown in FIG. 4B.

FIG. 4B shows a recognition dictionary 810 ("elephant.dic") for recognizing an elephant as an object. The recognition dictionary 810 contains a recognition target information 811 and a recognition parameter 812.

The image recognition unit 11 uses the recognition parameter 812 for recognizing an elephant as an object. The recognition parameter 812 includes, for example, a weight of a neural network and a threshold in Rowley et al, "Neural network-based face detection", IEEE TRANSACTIONS ON PATTERN ANALYSIS AND MACHINE INTELLIGENCE, VOL. 20, NO. 1, JANUARY 1998, or a parameter for defining a rectangular feature amount which a weak discriminator refers to, and an operation coefficient and a threshold for executing discrimination processing based on the rectangular feature amount in Viola and Jones, "Rapid Object Detection using Boosted Cascade of Simple Features", Proceedings of the IEEE Conference on Computer Vision and Pattern Recognition (CVPR'01). The recognition dictionary 810 contains the recognition parameter 812 in a format interpretable by the image recognition unit 11.

The recognition target information 811 is used for identifying an object which is detectable using the recognition parameter 812. The recognition target information 811 may be any information sufficient to create the metadata of an object after acquiring an image. As an example, character string data is stored as the recognition target information 811. Alternatively, an identifier (ID) may be used as the recognition target information 811. In this case, however, it had better to separately prepare a correspondence table of IDs and character strings representing objects, convert from an ID into a character string representing an object, and then present the converted character string to the user. For example, the recognition target information 811 contains a character string "elephant" as the identifier of the recognition parameter 812 for recognizing an elephant.

The structure of the recognition dictionary 810 is not limited to that shown in FIG. 4B. The fact that the recognition dictionary 810 contains the recognition target information 811 and the recognition parameter 812 in FIG. 4B only indicates a conceptual structure, that is, that the paired recognition target information 811 and corresponding recognition parameter 812 constitutes the recognition dictionary 810. Therefore, the recognition target information 811 and the recognition parameter 812 need not be stored in the same file. The recognition target information 811 and the corresponding recognition parameter 812 may be stored in separate files as long as they can be associated with each other.

Referring to FIG. 4B, the recognition dictionary 810 only contains the recognition target information 811 and the recognition parameter 812. However, this only shows a minimum structure. The recognition dictionary 810 may be configured to contain other data in addition to them, as needed.

Next, the structure of the dictionary set correspondence table 27 held by the server apparatus 26 will be described using FIG. 4C. If only the recognition dictionary group 23 is prepared on the server apparatus 26, the user needs to refer to each recognition dictionary included in the recognition dictionary group 23, and select recognition dictionaries to be downloaded into the image processing apparatus 25. Since the recognition dictionary group 23 includes a number of recognition dictionaries, however, referring to all the recognition dictionaries imposes a significant burden on the user. It is, therefore, necessary to divide and manage the recognition dictionary group 23 based on use purposes (recognition dictionary sets). In the embodiment, the recognition dictionary group 23 is managed as recognition dictionary sets each corresponding to a scheduled place such as an amusement park or aquarium where the user can stay.

FIG. 4C shows management tables for managing recognition dictionaries included in the recognition dictionary group 23 for each place. The management table 910 is used to manage a recognition dictionary set with a recognition dictionary set name "zoo". The file names of recognition dictionaries to be used for recognizing objects predetermined as those which can be in a captured image when capturing a zoo have been registered in the management table 910. The objects predetermined as those which can be in a captured image when capturing a zoo are an elephant, a giraffe, a penguin, and the like. Therefore, the file name "elephant.dic" of a recognition dictionary for recognizing an elephant, the file name "giraffe.dic" of a recognition dictionary for recognizing a giraffe, and the file name "penguin.dic" of a recognition dictionary for recognizing a penguin are registered in the management table 910. That is, the recognition dictionaries with the file names registered in the management table 910 form a recognition dictionary set associated with a zoo.

A management table 920 is used to manage a recognition dictionary set with a recognition dictionary set name "aquarium". The file names of recognition dictionaries to be used for recognizing objects predetermined as those which can be in a captured image when capturing an aquarium have been registered in the management table 920. The objects predetermined as those which can be in a captured image when capturing an aquarium are a sunfish, a shark, a penguin, and the like. Therefore, the file name "sunfish.dic" of a recognition dictionary for recognizing a sunfish, the file name "shark.dic" of a recognition dictionary for recognizing a shark, and the file name "penguin.dic" of a recognition dictionary for recognizing a penguin are registered in the management table 920. That is, the recognition dictionaries with the file names registered in the management table 920 form a recognition dictionary set associated with an aquarium.

A management table associated with another place may be created, as a matter of course. The dictionary set correspondence table 27 as a set of such management tables is registered in the server apparatus 26, as described above. The dictionary set correspondence table 27, however, is also downloaded into the schedule save unit 18.

As shown in FIG. 4C, "penguin.dic" is registered in both the management table 910 and the management table 920. This means that recognition processing associated with a zoo and that associated with an aquarium share the recognition dictionary "penguin.dic". It is thus unnecessary to provide "penguin.dic" with each recognition process, and only one "penguin.dic" is necessary.

Although a recognition dictionary set name is used as an example of the format of the dictionary set correspondence table 27 in FIG. 4C, the format is not limited to this. This embodiment has been explained on the assumption that the recognition dictionary group 23 and the dictionary set correspondence table 27 on the server apparatus 26 have already been prepared. The image processing apparatus 25, however, may edit or create those pieces of information at an appropriate timing. Another apparatus may edit or create the information, as a matter of course.

Processing for registering necessary recognition dictionaries in the recognition dictionary save unit 16 will be described next with reference to a flowchart in FIG. 3. The CPU 900 predominates the processing according to the flowchart in FIG. 3. The CPU 900 executes the processing according to the flowchart in FIG. 3 using computer programs and data stored in a memory (not shown) within the image processing apparatus 25. The same goes for any flowchart to be explained hereinafter.

In step S10, the CPU 900 acquires, in the memory (not shown) of the image processing apparatus 25, the schedule 20 which has been input by the user using the input unit 21. In step S11, the CPU 900 converts, as needed, the schedule 20 acquired in step S10 into a format interpretable by the image processing apparatus 25, and saves it in the schedule save unit 18. The interpretable format will be described below.

According to the schedule 20 shown in FIG. 4A, since a recognition dictionary set name corresponding to each time has been directly input, it is unnecessary to execute any processing in step S11. On the other hand, if "destination" is used instead of the recognition dictionary set name, the CPU 900 creates a table for associating "destination" with "recognition dictionary set name". For example, the CPU 900 associates "Ueno zoo" with "zoo".

In step S11, the CPU 900 also downloads the dictionary set correspondence table 27 from the server apparatus 26 into the schedule save unit 18. In step S12, the CPU 900 refers to the dictionary set correspondence table 27 downloaded from the server apparatus 26 into the schedule save unit 18, and specifies recognition dictionary names managed together with recognition dictionary set names described in the schedule 20 acquired in step S10.

If the schedule 20 is as shown in FIG. 4A, the recognition dictionary set names described in the schedule 20 are "zoo", "theme park", and "aquarium", and therefore, the CPU 900 specifies management tables for "zoo", "theme park", and "aquarium". The CPU 900 then requests, to the server apparatus 26, recognition dictionaries with recognition dictionary names (in FIG. 4C, "elephant.dic", "giraffe.dic", and "penguin.dic") registered in the management table for a zoo. The server apparatus 26 specifies the requested recognition dictionaries from the recognition dictionary group 23, and returns them to the image processing apparatus 25. The image processing apparatus 25 then registers, in the recognition dictionary save unit 16, the returned recognition dictionaries as a recognition dictionary set for a zoo. The processing of acquiring a recognition dictionary set will be executed for a theme park and aquarium in the same manner. This downloads the recognition dictionary set for a zoo, that for an aquarium, and that for a theme park from the server apparatus 26 into the recognition dictionary save unit 16.

Figure 3:
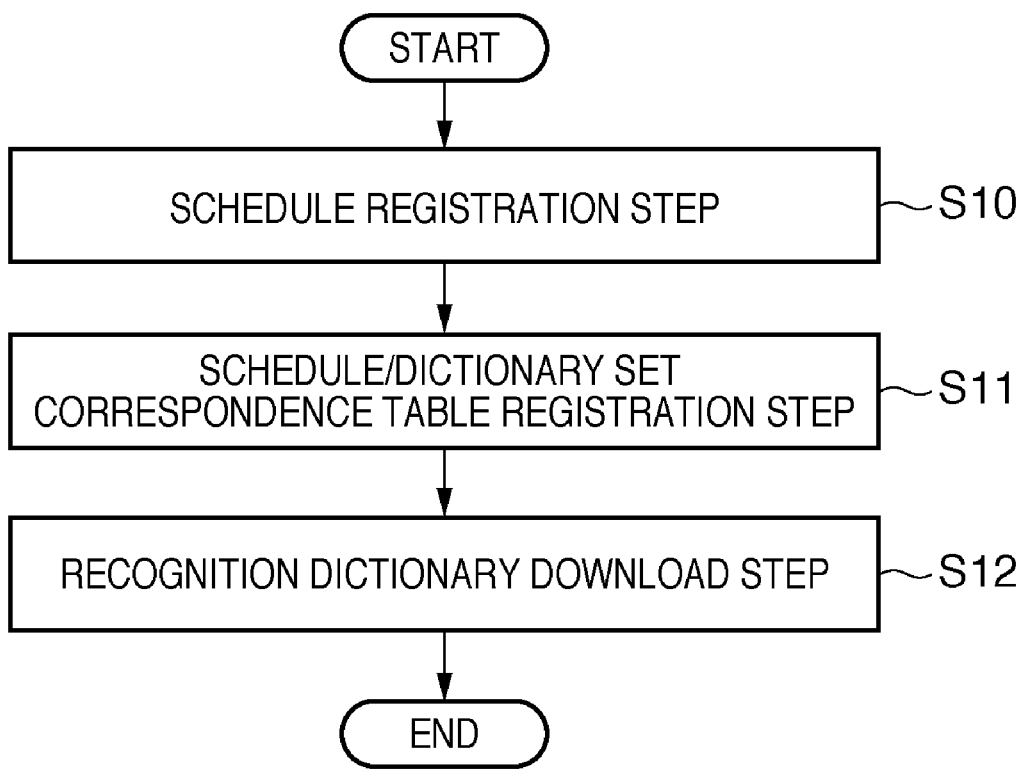
FIG. 3 is a flowchart illustrating registration processing of a recognition dictionary.

The recognition processing in the configuration shown in FIG. 1 after the processing according to the flowchart in FIG. 3 is completed will be explained with reference to a flowchart in FIG. 5.

In step S200, the recognition dictionary selection unit 15 selects, from the recognition dictionary save unit 16, recognition dictionaries to be used in the recognition processing executed on an image input via the image input unit 10, and downloads the selected recognition dictionaries into the recognition dictionary save unit 14. Details of the processing in step S200 will be explained later.

In step S300, the image recognition unit 11 performs, on the image input via the image input unit 10, the recognition processing using the recognition dictionaries downloaded into the recognition dictionary save unit 14. Assume, for example, that the recognition dictionary set for "zoo" has been downloaded into the recognition dictionary save unit 14. The recognition dictionary set for "zoo" includes recognition dictionaries such as "elephant.dic", "giraffe.dic", and "penguin.dic". As described above, each recognition dictionary contains a recognition parameter to be used for recognizing an object. The image recognition unit 11 executes, on the image input via the image input unit 10, the recognition processing using the recognition parameters contained in the recognition dictionaries downloaded into the recognition dictionary save unit 14. Details of the processing in step S300 will be described later.

In step S400, the image processing unit 12 performs preview display of the image input via the image input unit 10, and a recognition result in step S300 on the display unit 22. FIG. 6A shows a display example. In FIG. 6A, a frame 1201 as a result of recognizing an elephant is superimposed and displayed on the image of the elephant in a zoo.

If such an image including the elephant is acquired from the image input unit 10, the image recognition unit 11 uses the recognition parameters in the recognition dictionaries of the recognition dictionary set for "zoo" stored in the recognition dictionary save unit 14 to perform object detection on the acquired image. In the object detection, if the recognition parameter in the recognition dictionary "elephant.dic" matches that of an object, the frame 1201 is superimposed and displayed at the detection position. An output format of a recognition result is not specifically limited to this, and a format other than superimposing and displaying of the frame 1201 may be used.

If a capturing instruction is input via an instruction unit (not shown), the process advances to step S600 via step S500; otherwise, the process advances to step S700 via step S500. If a capturing instruction is input, an capturing request flag is set to TRUE; otherwise, the capturing request flag is set to FALSE. Assume that the initial value of the capturing request flag is FALSE.

In step S600, the image processing unit 12 stores, in the image save unit 13, the image acquired via the image input unit 10 and recognition information (metadata) as a recognition result by the image recognition unit 11 in association with each other. Furthermore, the image processing apparatus 25 returns the capturing request flag to FALSE.

An example of the structure of the information stored in the image save unit 13 by the image processing unit 12 will be explained using FIG. 6B. A file 1310 contains image data 1330 acquired from the image input unit 10, and metadata 1320 as a result of recognition processing executed by the image recognition unit 11 on the image data 1330. Since the recognition processing on the image data 1330 has recognized a person and elephant, a frame 1380 is superimposed and displayed at a position where the person has been detected, and a frame 1390 is superimposed and displayed at a position where the elephant has been detected. Consequently, the metadata 1320 includes a person recognition result and an elephant recognition result. Referring to FIG. 6B, the metadata 1320 includes capturing date "Oct. 20, 2008". Such a file is assigned, for example, an identifier "20081020.jpg", and saved in the image save unit 13.

If a capturing end instruction is input via the instruction unit (not shown), the process advances to step S800 via step S700; otherwise, the process returns to step S200 via step S700. If a capturing end instruction is input, an end request flag is set to TRUE; otherwise, the end request flag is set to FALSE. The capturing end instruction includes, for example, an instruction to power off the apparatus or that to switch to a mode in which recognition processing is not used. In step S800, the image processing apparatus clears the end request flag.

Details of the above processing in step S200 will be described with reference to a flowchart in FIG. 7. In step S210, the recognition dictionary selection unit 15 reads out the schedule 20 saved in the schedule save unit 18.

In step S220, the recognition dictionary selection unit 15 requests the current time to the time management unit 17. In response to this request, the time management unit 17 transmits time information indicating the current time to the recognition dictionary selection unit 15, and the recognition dictionary selection unit 15 thus acquires the time information. The recognition dictionary selection unit 15 then specifies, from the schedule 20 read out in step S210, time period data representing a time slot including the current time indicated by the acquired time information, and also specifies, from the schedule 20, a recognition dictionary set name corresponding to the specified time period data.

Assume, for example, that the current time indicated by the time information acquired from the time management unit 17 is at 15:00, and the schedule 20 has the structure shown in FIG. 4A. In this case, the recognition dictionary selection unit 15 specifies time period data "12:00-16:00" indicating a time slot including 15:00, and also specifies the recognition dictionary set name "theme park" corresponding to the specified time period data. The recognition dictionary selection unit 15 then checks whether the recognition dictionary save unit 14 stores the recognition dictionary set with the specified recognition dictionary set name.

In step S230, the recognition dictionary selection unit 15 checks whether the recognition dictionary save unit 14 stores a recognition dictionary set not currently used. If the recognition dictionary save unit 14 stores a recognition dictionary set not currently used, the process advances to step S240; otherwise the process advances to step S250.

If, for example, the current time is at 15:00 and the recognition dictionary save unit 14 stores the recognition dictionary sets for "zoo" and "theme park", the recognition dictionary set for "zoo" is not currently used. In this case, therefore, the process advances to step S240.

In step S240, the recognition dictionary selection unit 15 disables the recognition dictionary set which has been specified as a recognition dictionary set not currently used in step S230. There are various methods for disabling a recognition dictionary set. For example, a recognition dictionary set not currently used is deleted from the recognition dictionary save unit 14. Alternatively, a recognition dictionary unnecessary flag may be prepared within the recognition dictionary save unit 14 in advance. In this case, the recognition dictionary unnecessary flag of a recognition dictionary set currently used may be set to off, and the recognition dictionary unnecessary flag of a recognition dictionary set not currently used may be set to on.

In step S250, the recognition dictionary selection unit 15 refers to the result of the check in step S220, that is, a result of the check processing of whether the recognition dictionary save unit 14 stores a recognition dictionary set currently used. If the unit 14 stores a recognition dictionary set currently used, the processing in step S200 ends; otherwise, the process advances to step S260.

Since the recognition dictionary selection unit 15 has specified in step S220 the recognition dictionary set currently used, it acquires the specified recognition dictionary set from the recognition dictionary save unit 16, and downloads it into the recognition dictionary save unit 14 in step S260. If the above recognition dictionary unnecessary flag is introduced, the recognition dictionary unnecessary flag of the recognition dictionary set currently used is set to off in step S260.

The above-described processing in step S200 registers, in the recognition dictionary save unit 14, the recognition dictionary set to be used in executing recognition processing on an image of a place where the user has been scheduled to stay at the current time. That is, if the user moves to a place according to a schedule based on the schedule 20, a recognition dictionary set necessary for executing the recognition processing on an image of a place where the user currently stays is always registered in the recognition dictionary save unit 14. With this processing, when executing the recognition processing, the image recognition unit 11 only refers to a currently necessary recognition dictionary set, thereby preventing unnecessary recognition dictionaries from being referred to.

Details of the above processing in step S300 will be explained with reference to a flowchart in FIG. 8. In step S310, the image recognition unit 11 acquires an image from the image input unit 10. This acquired image may be a still image, or an image for one frame of a moving image. For a moving image, processing to be described below is executed on an image of each frame.

In step S320, the image recognition unit 11 initializes a variable I to 0. The variable I is used for counting the number of recognition dictionaries used in recognition processing executed on the image acquired in step S310.

In step S330, the image recognition unit 11 determines whether the value of the variable I is smaller than the number NumOfActiveDic of the recognition dictionaries downloaded in step S200. If I<NumOfActiveDic as a result of determination, the process advances to step S340; otherwise, the processing in step S300 ends.

In step S340, the image recognition unit 11 executes the recognition processing using the Ith recognition dictionary of the recognition dictionary set downloaded in step S200. In step S350, the image recognition unit 11 increments the value of the variable I by one. The process then returns to step S330.

In summary, in order to recognize objects in an image, this embodiment assumes the following two holding configurations:

holding schedule information (the schedule 20) for managing, in association with each other, scheduled place information indicating a place where the user is scheduled to stay, and scheduled time slot information indicating a time slot during which the user is scheduled to stay in the scheduled place (the first holding unit); and holding recognition dictionaries to be used for recognizing objects in association with the scheduled place information (the second holding unit).

In the recognition processing, while acquiring time information indicating the current time, an image of a place where the user stays at the current time is acquired. Scheduled place information which is managed by the schedule 20 in association with scheduled time slot information indicating a time slot including the acquired time information is specified (the first specifying unit), and recognition dictionaries held in association with the specified scheduled place information are also specified (the second specifying unit). Then, the specified recognition dictionaries are used to recognize objects in the image.

[Second Embodiment]

The first embodiment is implemented when the user acts according to a schedule managed by the schedule 20. In fact, however, the user may act behind schedule, or change the schedule. In consideration of these cases, the second embodiment allows to edit a schedule 20 as needed.

Figure 5:
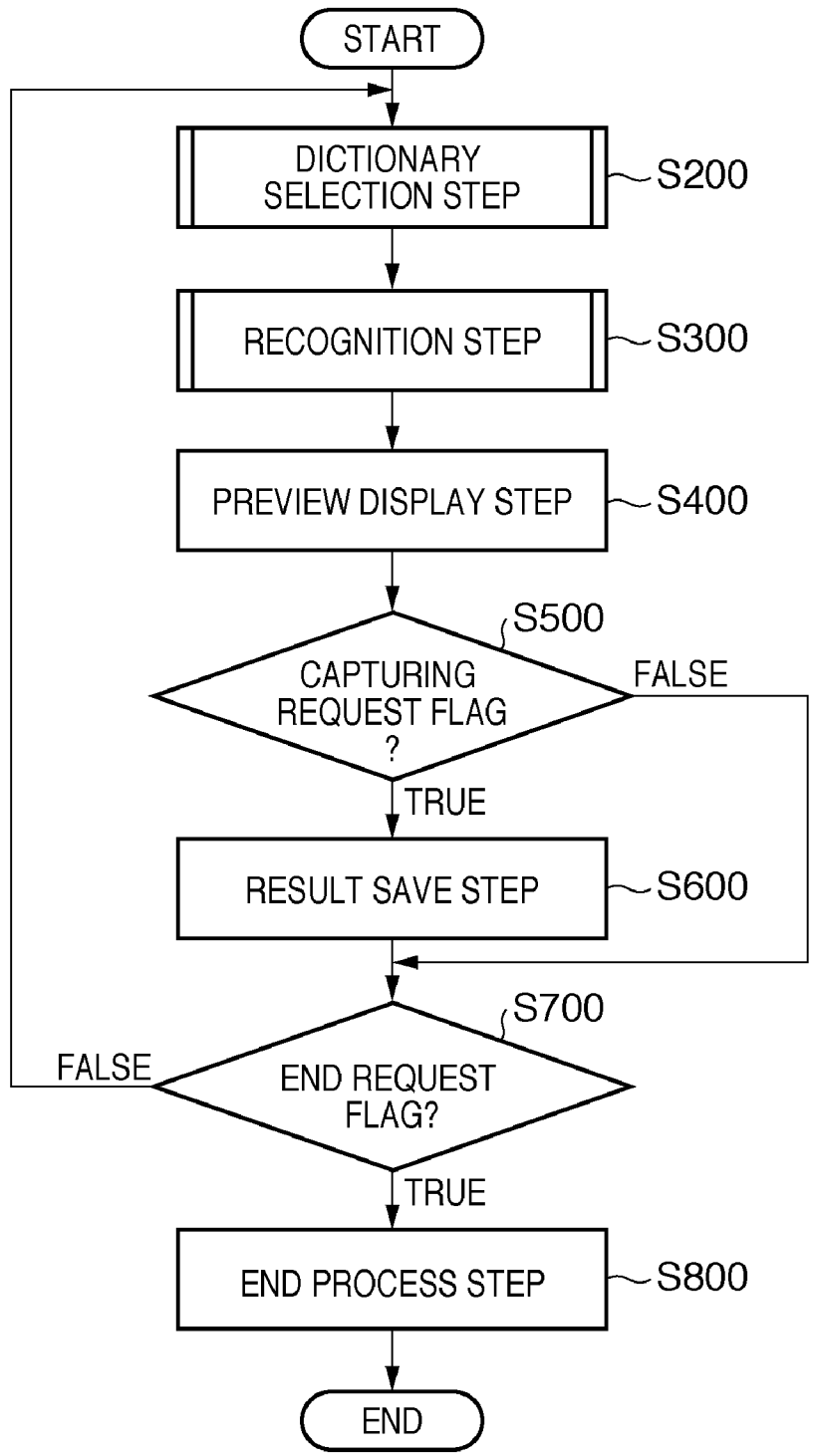
FIG. 5 is a flowchart illustrating recognition processing.
Figure 10:
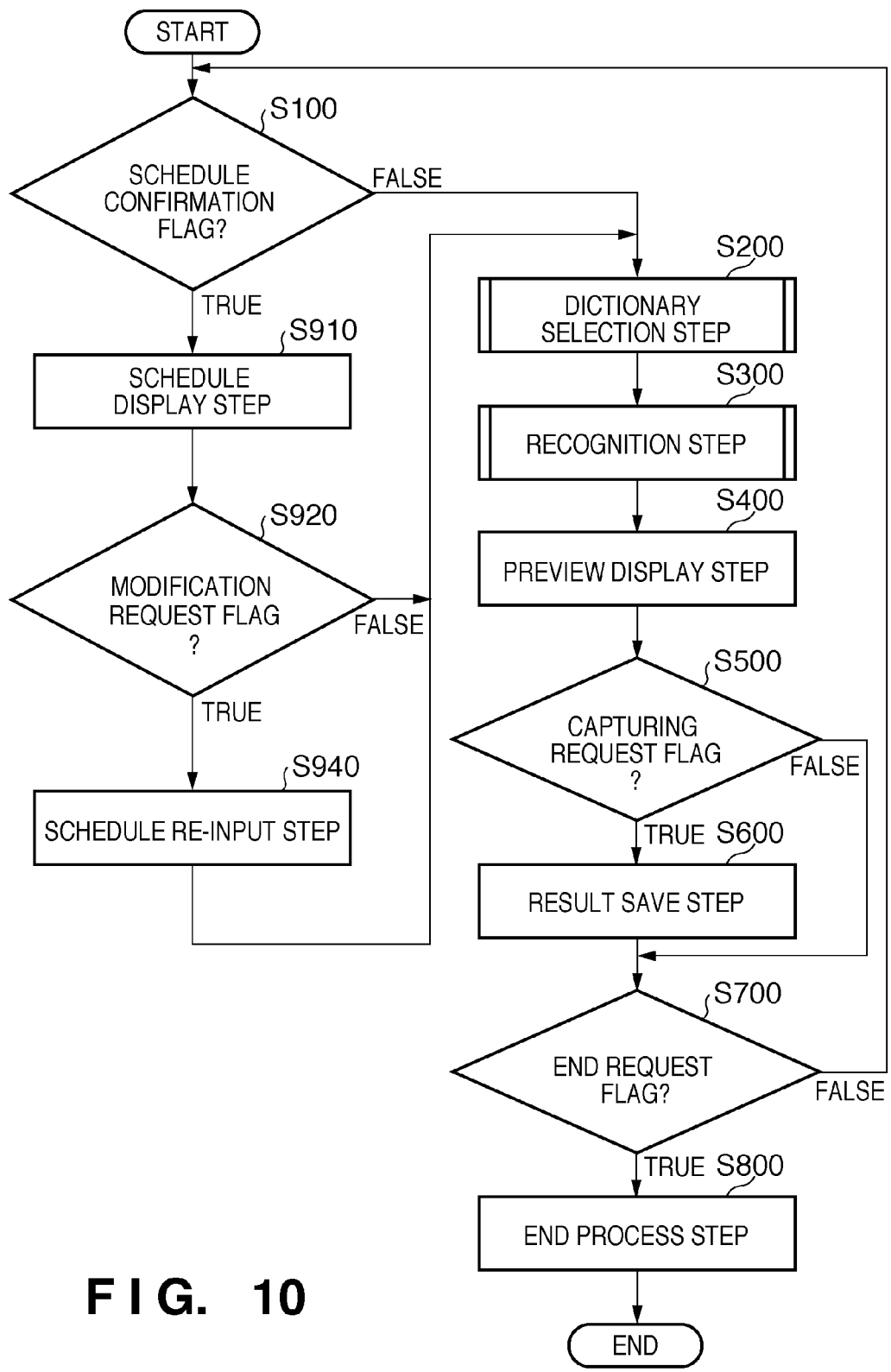
FIG. 10 is a flowchart illustrating recognition processing.

The second embodiment is the same as the first one except that an image processing apparatus of FIG. 1 executes processing according to a flowchart in FIG. 10 instead of the above processing according to the flowchart in FIG. 5. Note that in the flowchart shown in FIG. 10, processes having the same step numbers as in FIG. 5 are the same as described in the first embodiment, and a description thereof will be omitted.

In step S100, the image processing apparatus checks whether the user has input a schedule change request using an instruction unit (not shown) of the image processing apparatus. If the user has input a schedule change request as a result of the checking processing, the process advances to step S910; otherwise, the process advances to step S200. If the user has input a schedule change request, a schedule confirmation flag is set to TRUE; otherwise, the schedule confirmation flag is set to FALSE.

In step S910, the image processing apparatus displays a GUI for changing the schedule 20 on a display unit 22. The image processing apparatus displays, on the GUI, time period data registered in the schedule 20 as a staying time slot, and a recognition dictionary set name as a stay place name, and also additionally displays a check mark or the like for time period data indicating a time slot including the current time.

If the user inputs an instruction to change the schedule 20 using an input unit 21 to the GUI, the process advances to step S940 via step S920. Alternatively, if the user inputs an instruction not to change the schedule 20 using the input unit 21, the process advances to step S200 via step S920. If the user inputs an instruction to change the schedule 20, a modification request flag is set to TRUE. If the user inputs an instruction not to change the schedule 20, the modification request flag is set to FALSE.

Since the user has input an instruction to change the schedule 20 using the input unit 21, the image processing apparatus accepts the input instruction in step S940. The user can use the above GUI to change the time period data for which the check mark is additionally displayed, and the recognition dictionary set name corresponding to the time period data.

Assume, for example, that "9:00-11:00 (the time period data); Ueno zoo (the recognition dictionary set name)" is registered in the schedule 20 and the current time is at 10:30 but the user cancels Ueno zoo to directly move to an amusement park. In this case, the image processing apparatus changes the start time "9:00" to the current time "10:30" in the time period data. This changing operation may be done when the user uses the input unit 21 to designate the display position of "9:00", and then input "10:30", or may be automatically done by the image processing apparatus without any input from the input unit 21. In the latter case, since the time management unit 17 counts the current time, this counted time is used as the current time. To change the end time "11:00", the user uses the input unit 21 to designate the display position of "11:00", and then input a desired time.

Furthermore, the user uses the input unit 21 to change the recognition dictionary set name from "Ueno zoo" to "amusement park". To change the recognition dictionary set name, when the user uses the input unit 21 to designate the display position of "Ueno zoo", the image processing apparatus lists, on the display unit 22, the recognition dictionary set names of all recognition dictionary sets stored in a recognition dictionary save unit 16. The user uses the input unit 21 to select "amusement park" from the listed recognition dictionary set names. This makes it possible to change "Ueno zoo" to "amusement park". If the user changes the end time to a later time than "11:00", the time period data of the subsequent schedule may change. In this case, the user may use the input unit 21 to edit the time period data, as needed, or may change the time period data of the subsequent schedule by a delay time.

As described above, the user can edit the schedule 20 so as to be consistent with his/her actual acts, as needed. The process then advances to step S200. Note that in the first embodiment, if the end request flag is FALSE in step S700, the process returns to step S200. In this embodiment, however, if an end request flag is FALSE, the process returns to step S100.

[Third Embodiment]

In the first and second embodiments, if the user stays in the same place, it is possible to use only one recognition dictionary set. The third embodiment allows to switch recognition dictionaries depending on a time slot, even if the user stays in the same place.

If, for example, time period data "10:00-22:00" and a recognition dictionary set name "theme park" are registered in the schedule 20, it is possible to use only a recognition dictionary set for a theme park from 10:00 to 22:00, in the first and second embodiments. In this case, this embodiment prepares a recognition dictionary set for each predetermined time slot as a recognition dictionary set for a theme park. FIG. 11 shows an example of a dictionary set correspondence table 27 according to this embodiment.

According to the dictionary set correspondence table 27 of FIG. 11, when using a recognition dictionary set for a theme park, if the current time falls within a time slot from 10:00 to 18:00, a recognition dictionary set "theme_park.day" including "parade.dic", "character-A.dic", and "coaster-A.dic" is used. If the current time falls within a time slot from 18:00 to 22:00, a recognition dictionary set "theme_park.night" including "fireworks.dic", "character-A.dic", and "coaster-A.dic" is used.

As described above, it is possible to switch recognition dictionaries depending on a time slot even if the user stays in a theme park all the time, by configuring the dictionary set correspondence table 27 so as to be able to select and use, depending on a time slot, a recognition dictionary set for a theme park. The same goes for places other than a theme park.

The structure of the dictionary set correspondence table 27 is not limited to this, and any structure may be adopted as long as it is possible to obtain the same effects. Although the dictionary set correspondence table 27 manages one recognition dictionary set as that for each time slot in this embodiment, an environmental element other than "time" may be used. For example, the dictionary set correspondence table 27 may manage one recognition dictionary set as that for each weather condition or season.

The above-described embodiments may be combined as needed, and then used. The apparatuses which have been explained above as separate apparatuses and those which have been described above as the same apparatus are not limited to them, and various modifications may be possible.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-241882 filed Oct. 20, 2009 which is hereby incorporated by reference herein in its entirety.

What is claimed is:

1. An image processing apparatus comprising:
a first holding unit which holds schedule information for managing, in association with each other, scheduled place information indicating a place where a user is scheduled to stay and scheduled time slot information indicating a time slot during which the user is scheduled to stay in the scheduled place;
a second holding unit which holds, in association with the scheduled place information, a recognition dictionary to be used for recognizing an object that is in an captured image when capturing the scheduled place;
an acquisition unit which acquires time information indicating a current time, and also acquires an image of a place where the user stays at the current time;
a first specifying unit which specifies scheduled place information that is held in said first holding unit in association with scheduled time slot information indicating a time slot including the time information acquired by said acquisition unit;
a second specifying unit which specifies a recognition dictionary that is held in said second holding unit in association with the scheduled place information specified by said first specifying unit;
a recognition unit which recognizes an object in the image acquired by said acquisition unit using the recognition dictionary specified by said second specifying unit; and
an output unit which outputs recognition information indicating a result of the recognition processing by said recognition unit.

2. The apparatus according to claim 1, further comprising:
an input unit which inputs the scheduled place information and the scheduled time slot information, and registers the input scheduled place information and the input scheduled time slot information in said first holding unit;
a request unit which requests, to a server apparatus for managing a plurality of recognition dictionaries in association with the scheduled place information, a recognition dictionary corresponding to the scheduled place information input by said input unit; and a unit which registers, in said second holding unit in association with the scheduled place information input by said input unit, a recognition dictionary that has been transmitted from the server apparatus in response to the request by said request unit.

3. The apparatus according to claim 1, further comprising:
an edit unit which edits the scheduled place information and the scheduled time slot information.

4. The apparatus according to claim 1, wherein
said second holding unit holds the recognition information in association with time slot information indicating a predetermined time slot and the scheduled place information, and
said second specifying unit specifies a recognition dictionary which is held in said second holding unit in association with the scheduled place information specified by said first specifying unit, and time slot information indicating a time slot including a time represented by the time information acquired by said acquisition unit.

5. The apparatus according to claim 1, wherein said output unit outputs the recognition information in association with the image to a storage device.

6. A non-transitory computer-readable storage medium storing a computer program which causes a computer to function as each unit of an image processing apparatus of claim 1.

7. An image processing method for an image processing apparatus which includes
a first holding unit which holds schedule information for managing, in association with each other, scheduled place information indicating a place where a user is scheduled to stay and scheduled time slot information indicating a time slot during which the user is scheduled to stay in the scheduled place, and
a second holding unit which holds, in association with the scheduled place information, a recognition dictionary to be used for recognizing an object that is in an captured image when capturing the scheduled place,
the method comprising:
an acquisition step of acquiring time information indicating a current time, and also acquiring an image of a place where the user stays at the current time;
a first specifying step of specifying scheduled place information which is held in the first holding unit in association with scheduled time slot information indicating a time slot including the time information acquired in the acquisition step;
a second specifying step of specifying a recognition dictionary which is held in the second holding unit in association with the scheduled place information specified in the first specifying step;
a recognition step of recognizing an object in the image acquired in the acquisition step using the recognition dictionary specified in the second specifying step; and
an output step of outputting recognition information indicating a result of the recognition processing in the recognition step.

\* \* \* \* \*